United States Patent Office 3,790,652
Patented Feb. 5, 1974

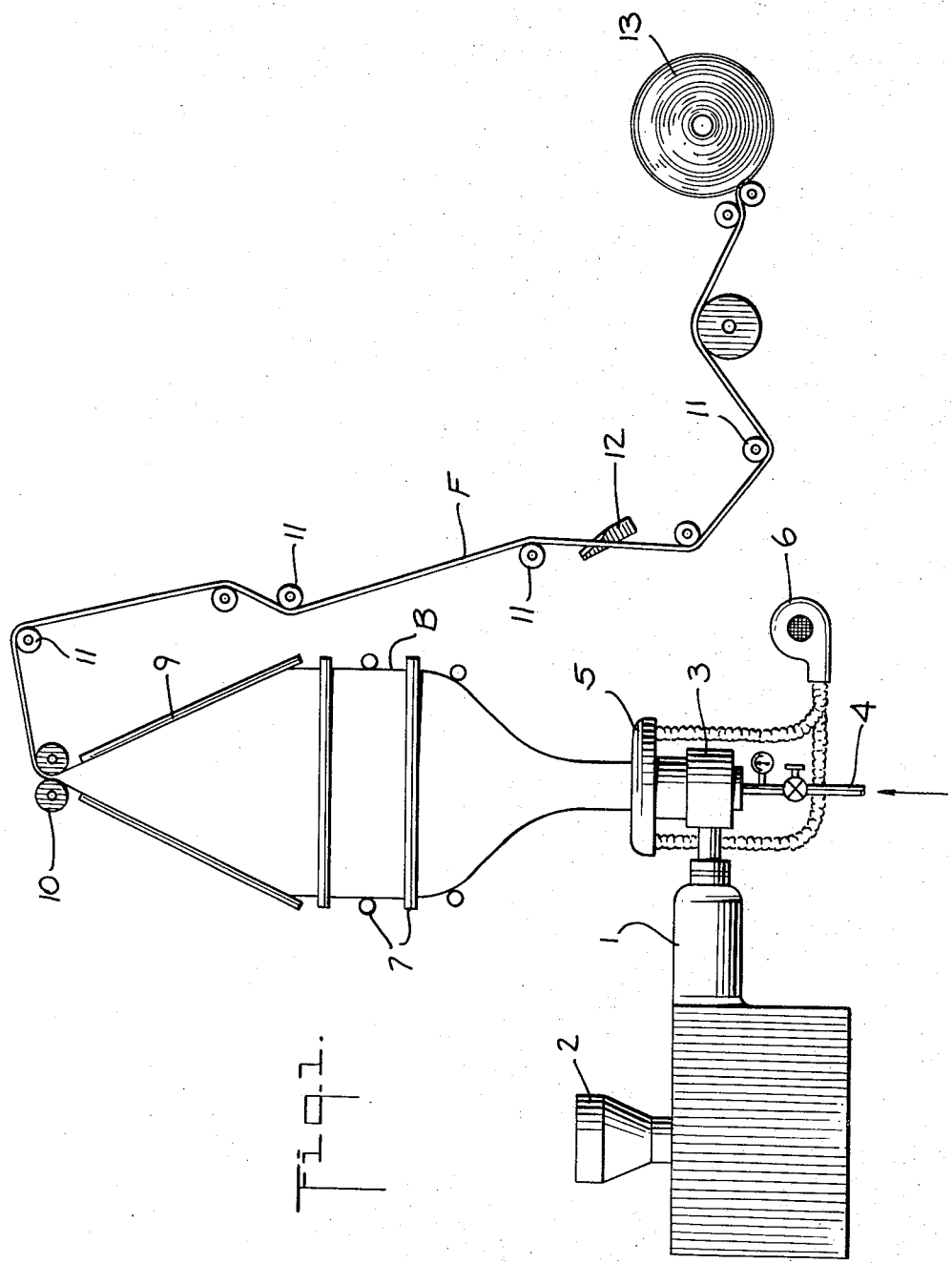

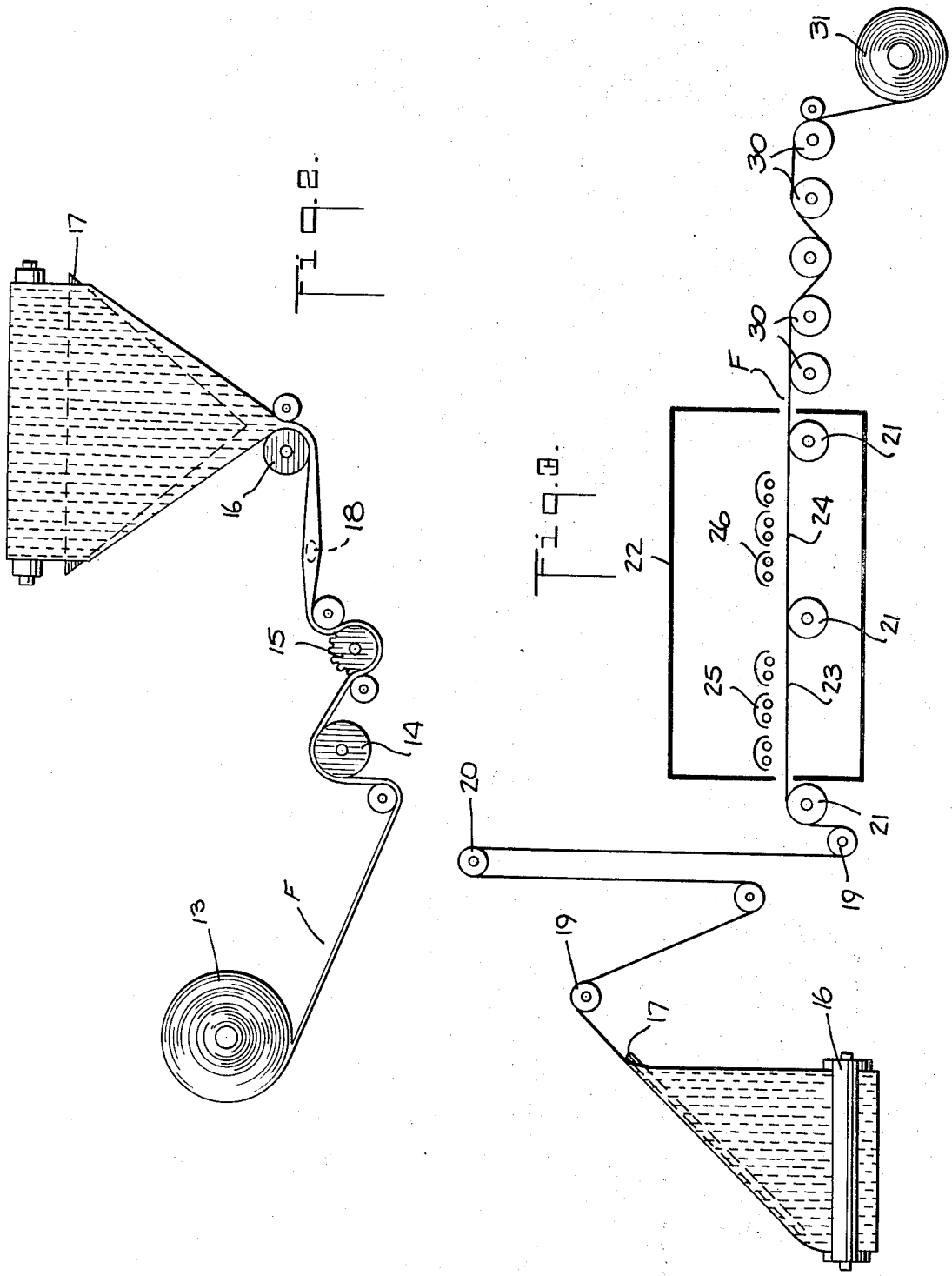

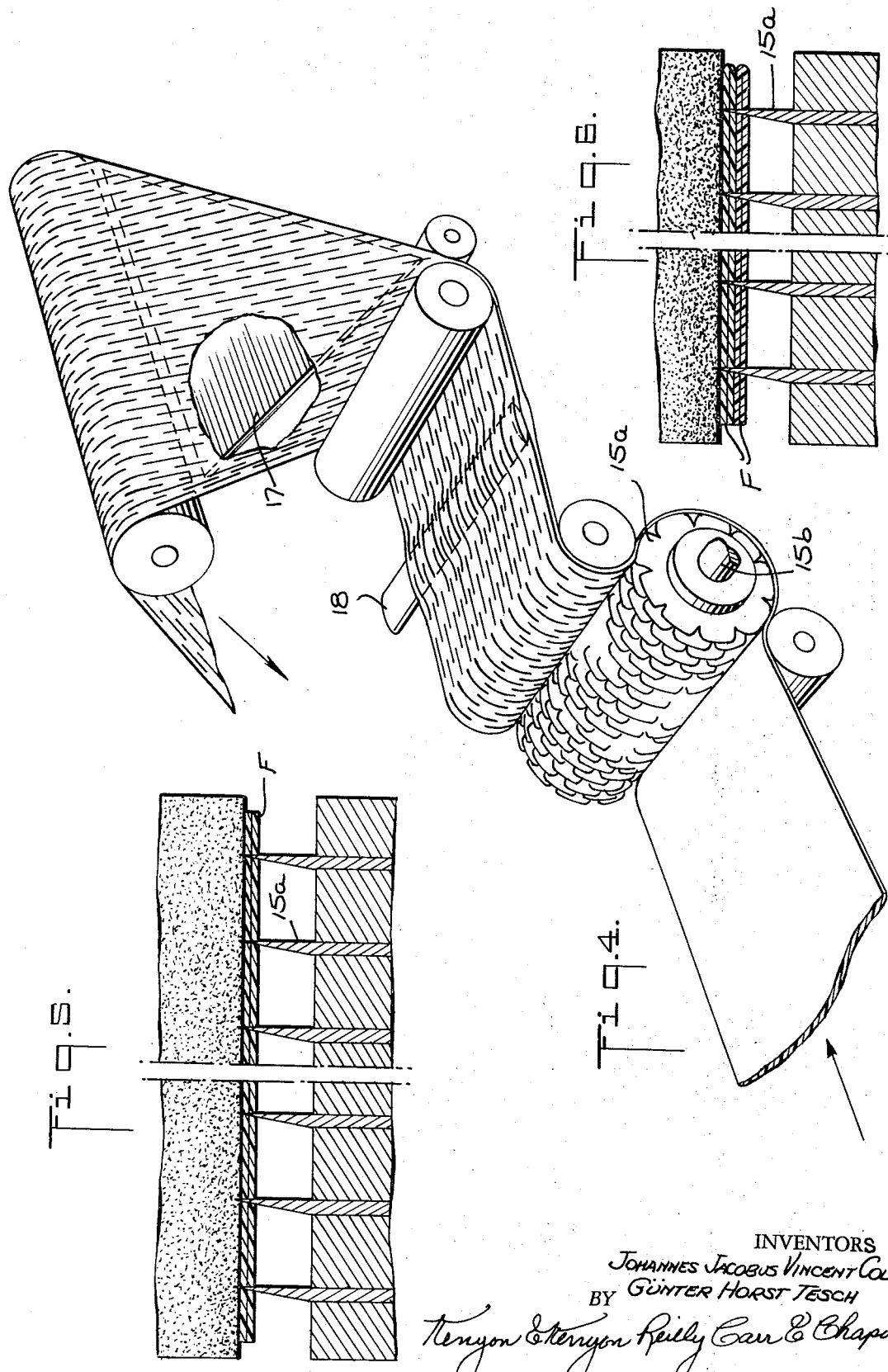

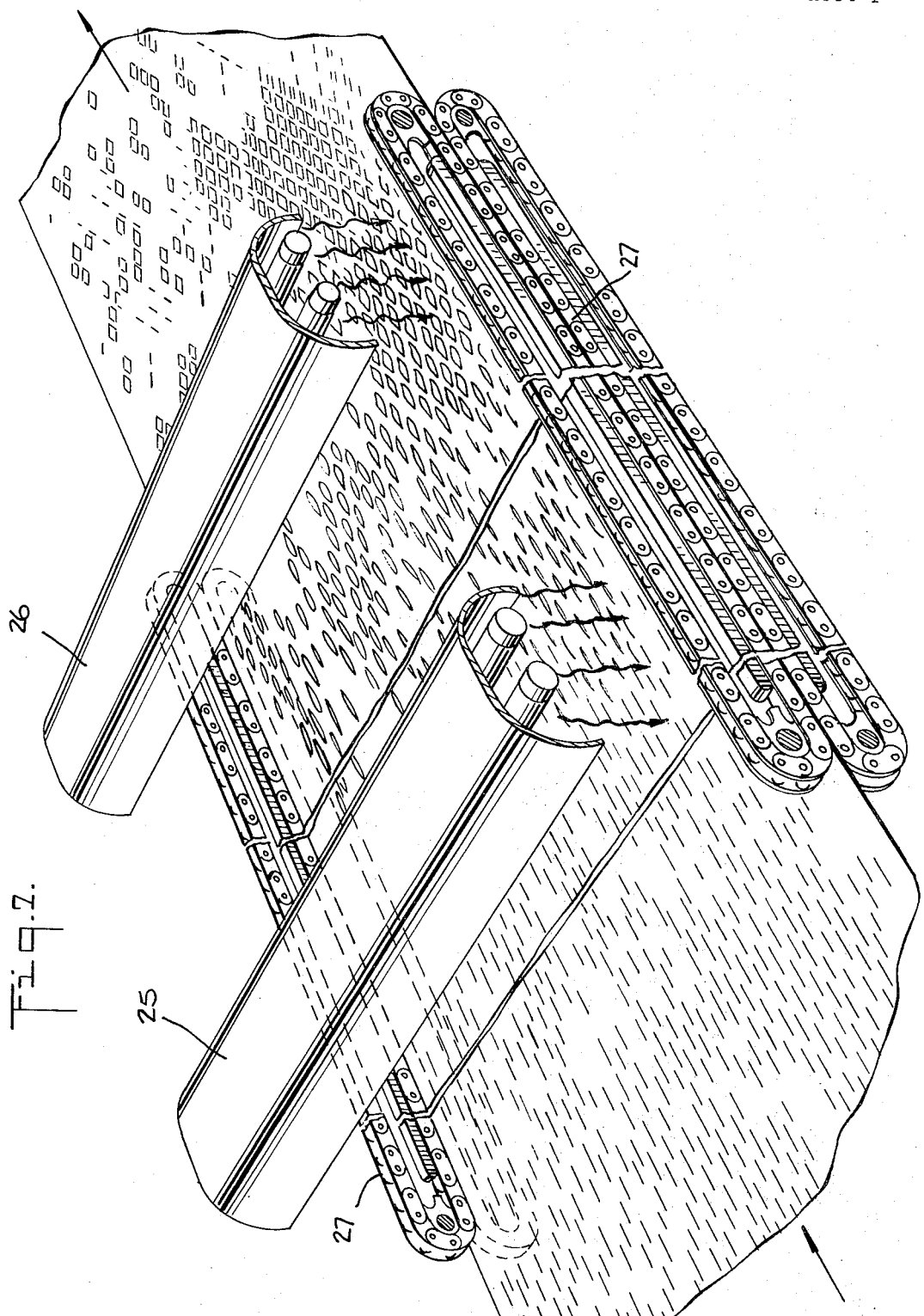

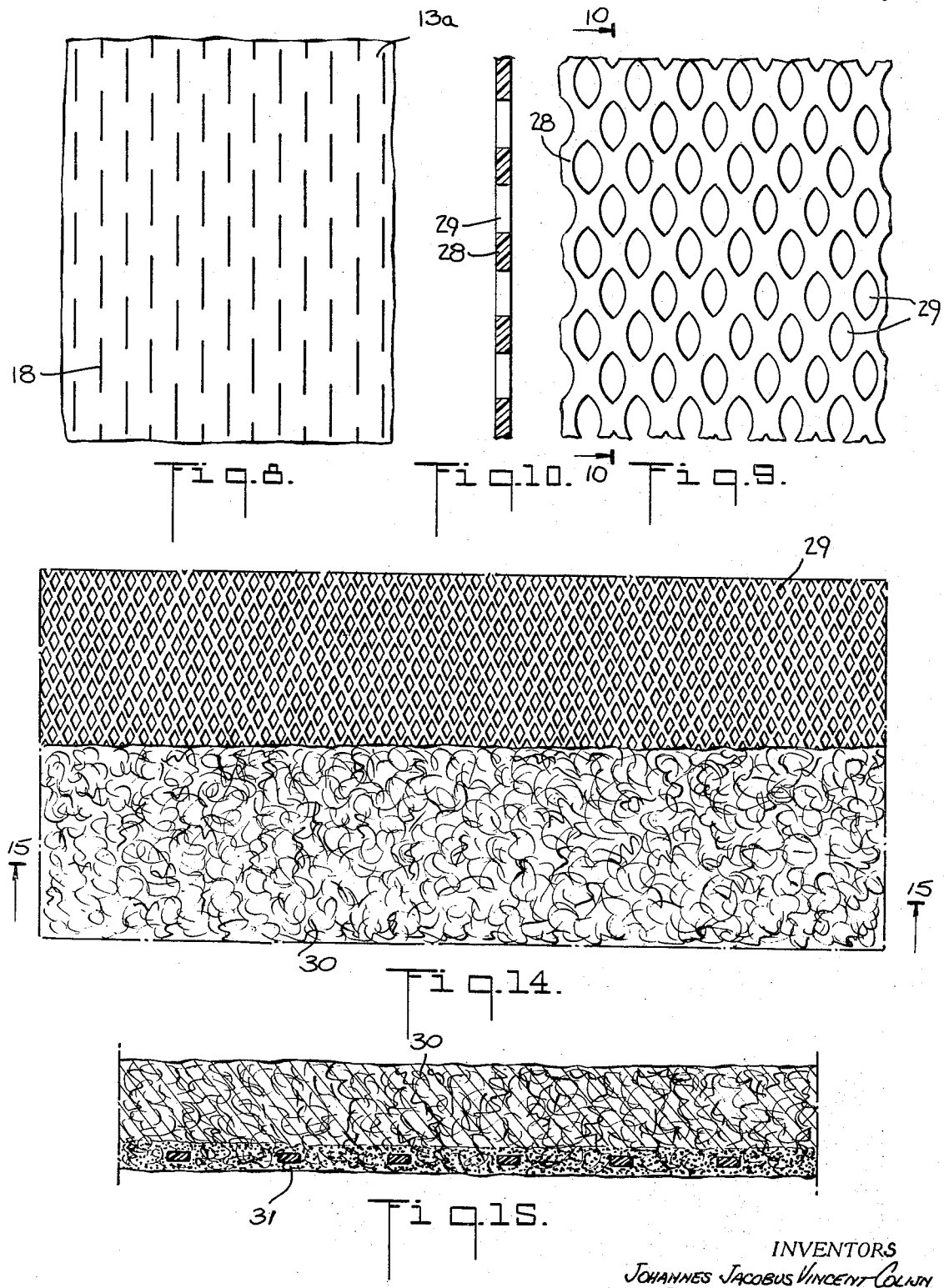

3,790,652
METHOD FOR PRODUCING A THERMO-PLASTIC NET BY SLITTING AND SHRINKING OPERATIONS
Johannes Jacobus Vincent Colijn and Günter Horst Tesch, Fribourg, Switzerland, assignors to Breveteam S.A., Fribourg, Switzerland
Continuation-in-part of abandoned application Ser. No. 28,705, Apr. 5, 1970. This application June 8, 1971, Ser. No. 151,011
Int. Cl. B29c 17/10, 17/14; B29d 7/20
U.S. Cl. 264—146    8 Claims

ABSTRACT OF THE DISCLOSURE

Thermoplastic film is extruded by a practice forming a film that is highly shrinkable transversely relative to any longitudinal shrinkability. A suitable pattern of longitudinal slits is formed through this film and thereafter it is continuously passed through a zone which opens the slits by shrinking the film to form a net which is coiled.

---

This is a continuation-in-part of application Ser. No. 28,705, filed Apr. 5, 1970, and now abandoned, disclosing and claiming an invention relating to the manufacture of plastic net.

The prior art suggests the manufacture of plastic net by the formation of a pattern of slits through plastic film which is mechanically stretched to open the slits and form a net, but it is difficult to obtain a uniform opening of the slits and the resulting net is distorted so that subsequent flattening and heat stabilization is required.

To summarize briefly the now preferred form of the present invention, a suitable thermoplastic is extruded to form a plastic film of high shrinkability transversely to its extrusion direction as compared to any longitudinal shrinkability. Preferably the film is produced by the blown process with a blow-up ratio in the area of from 1:3.5 to 1:7.0 and with the minimum drawdown or longitudinal extension permitted by the equipment used. Flat film extrusion is possible providing the drawdown is held to a minimum, but to obtain the high transverse shrinkability of the highly blown film, a tenter must be used for transverse stretching, introducing the expense of tentering equipment. Some thermoplastic substances, however, which are difficult to blow, such as polyesters and polyurethanes and some foamed items, are advantageously processed by this flat extrusion method. After flattening, the blown film is slit along one fold and coiled, all of this being one continuous operational phase and the length of film coiled depending only on the coil handling facilities available. Film produced by the described flat film extrusion practice, instead of the blown process, is correspondingly coiled. It is to be understood that in either case the extruded plastic film has a substantially uniform width and may be of infinite length and is usually coiled for handling.

The transversely highly shrinkable film is uncoiled and as continuously traveling film from the coil is passed through a slitter forming a suitable pattern of longitudinally extending slits leaving portions or strands between the mutually adjacent slits, and while conveyed so that the film is free to shrink, is continuously passed through a heating zone and recoiled. The heat used is sufficient to cause these portions or strands of the transversely shrinkable films, to shrink, but insufficient to reduce the tearing resistance of the film below that which might result in tearing due to the tension caused by the longitudinal shrinking forces and by the traction forces exerted by the necessary film conveying devices. The heat should not be sufficient to soften the film to a condition capable of wetting and adhering to surfaces contacted by the film.

While passing through the heating zone, the film transversely shrinks throughout the above portions or strands to form a multitude of shrunk strands to thereby open the slits to form a net or network which is thereafter set by cooling before being recoiled. The pattern and mesh size is determined by the pattern and size of the slits formed before the heating zone is reached and by the degree of the shrinkage. The blown film may be unfolded or opened to its full width to form a very wide plastic net while passing through the heating zone, or left doubled so that the two layers adhere to each other to form a plastic net of greater thickness. In the latter case the fold line does not need to be slit. A larger number of film layers may be superimposed to form an even thicker and, therefore, stronger net.

It is also possible to slit the blown film along the two fold lines and to coil the resulting two strips on two separate coils, in which case the width of each strip is the half of the circumference of the blowing bubble. Only one thickness of film may be passed through the slitter, or two films of different colors or of different material characteristics may be superimposed at the feeding side of the slitter.

Because both the film production and netting phases are continuous operations in which the processing speeds are of the same order of magnitude, they may be combined as one continuous operation without the interposed coiling and uncoiling described above.

Because in both instances the film is flat prior to slitting, it may be imprinted by suitable rotary printing equipment for display after the netting operation. Because the net may be made with varying thicknesses, it may be used for a great variety of purposes requiring varying degrees of mechanical strength. Because the thermoplastic film may be colored and the pattern of slits, and possibly die cut longitudinally elongated openings, may be varied both in size, pattern and location relative to the film's width, net of a highly decorative character may be produced. In all cases the net itself may be produced with the unique characteristic that it may be made in lengths which are, in the practical sense, unlimited, it may be made in very wide widths by unfolding the blown film, strengthened, stiffened or increased in weight per square area if desired by superimposing multiple layers of film prior to the slitting, and the net may be produced in a flat condition with a completely uniform thickness both transversely and longitudinally with respect to the film without enlargements in thickness at the junctions of the strands defining the net pattern and which would be the strand crossovers, and therefore, thickened portions when strands are crisscrossed or interwoven as in the prior art. Mechanically stretched film when using corresponding slits is not flat because the individual strips, portions or strands defining the net pattern are turned out of their original plane, the product requiring flattening by passage through two pressing rollers and heat stabilization, whereas in the present invention the corresponding strips, portions or strands remain in the same plane to produce a flat net. The net of the present invention is inherently strengthened because during the shrinkage the film becomes thicker.

The net produced by the present invention has a controllable uniform net pattern that has the appearance of being die cut from flat plastic film without having the sharp cutting edges and injuries produced by the cutting tool. These injuries by which the molecule configuration is disrupted when the plastic film is cut, are cured out by the heating process in the case of the present invention. The unique die-cut appearance results from the transverse orientation of the slits with respect to the direction of shrinkability, the pattern slitting and, importantly, from continuously passing the film in the form of a free span supported only at its ends, through a heating zone providing for a uniform increase of temperature throughout the whole width of the film starting at the beginning of the heating zone and of a thorough and uniform softening of the thermoplastic material at the end of the heating zone so that the individual strands between the slits smoothly shrink in the transversely shrinking direction of the film without random localized shrinkage such as would cause rupture of isolated strands.

Instead of passing the film through a slitter forming a pattern of longitudinally extending slits, the slitter may be of the kind known in the art for expanding metal sheets which gives a pattern of transversely extending slits, provided that the film web has a suitable shrinkability in the longitudinal direction. In this case the process according to the invention offers the advantage that the individual strands depressed out from the film plane by the cutting tools are straightened by the shrinking process. With respect to the blowing process described hereinbefore, in the case of such transversely extending slits the blowing ratio may be reduced, and the drawdown speed increased. This provides for a better production rate. However, the passage through a transversal slitter is considerably slower than through a slitter for longitudinal slitting so that this process is convenient only for such cases where a transversal orientation of the opening pattern is required.

A specific example of the manufacturing phases of the present invention and various specific examples of the net produced are illustrated by the accompanying drawings in which:

FIG. 1 is an elevation view of the equipment used for blowing the film;

FIG. 2 in elevation shows the pattern slitting and unfolding or opening of the blown film, this being an end view with respect to FIG. 3;

FIG. 3 in elevation shows the opening of the blown film and its passage through the heating zone and coiling of the final product;

FIG. 4 is a perspective view showing the pattern slitting and opening of the film;

FIG. 5 schematically in cross section shows the slitting of the unfolded blown film;

FIG. 6 is like FIG. 5 excepting that it shows the slitting of superimposed unfolded blown films;

FIG. 7 is a perspective view showing the slit film passing through the heating zone and illustrating the opening of the slits by shrinkage of the transversely oriented film to form the net;

FIG. 8 is a plan view of a segment of the film with a pattern resulting in the net pattern shown by FIG. 9;

FIG. 9 shows the film of FIG. 8 after the thermal netting step;

FIG. 10 is a cross section taken through the line 10—10 of FIG. 9;

FIG. 14 is a plan view of a segment of the net as it may be used for the mechanical purpose of backing floor covering material; and FIG. 15 is a cross section on the line 15—15 of FIG. 14.

Figure 11:
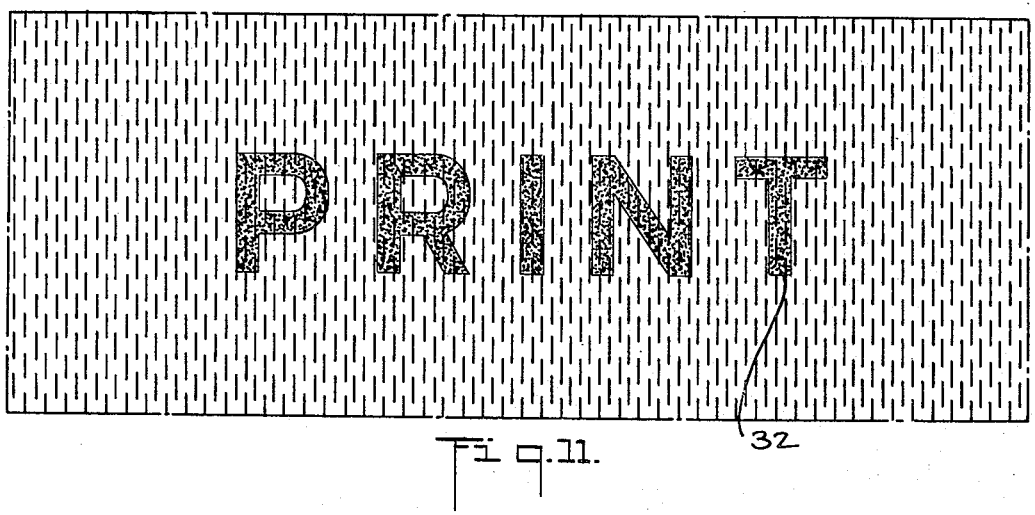
FIG. 11 shows a segment of film with a pattern of slits of the character shown by FIG. 8 and illustrating an example of printing.

For the practice of the present invention, suitable thermoplastics are known to the plastics industry. The thermoplastic selected should be capable of being formed into shrinkable film. Thermoplastics which cannot be formed into film by the blown film extrusion process must be worked by the flat film extrusion method having the disadvantage that to obtain the high transverse and low longitudinal shrinkability previously described, continuous tentering equipment must be used with its attendant large equipment investment cost unless transversely extending slits are used, the flat film extrusion method being capable of producing film of high shrinkability in the longitudinal direction. The blown film extrusion method is preferred in the parctice of the present invention.

Examples of suitable thermoplastics which can be blown are: low or high density polyethylene, polyvinylchloride, polyamide, polypropylene, and the like.

As a generality, any plastic may be used which can be formed into a shrinkable film when heated or otherwise treated, and which may be produced in long lengths permitting continuous handling in strip form and having adequate width for the purpose for which the net is intended to be used.

As this invention is practiced at present, the thermoplastic is polyethylene in pellet form sold under the trade mark "Lupolen 1840 D" by the Badische Anilin- & Soda-Fabrik AG, West Germany. It is a low-density polyethylene with a very high molecular weight and is particularly suitable for extrusion. It may be colored if desired and also it may be used with a foaming agent as is known in the art for the production of foam film. That is to say, the present invention may be used also to produce a net of foam film when desired.

As shown by FIG. 1, what may be a standard screw-type extruder 1 to which the polyethylene granules or pellets, including a suitable foaming agent if a foam film is desired, are fed by a hopper 2. After plasticizing by the screw action of the extruder, the extruder feeds the plasticized plastic through a side fed annular die 3 having a rotary mandrel or torpedo (not shown) and which upwardly extrudes a cylinder of the plastic. In the conventional fashion, internal air is introduced through the mandrel by way of a supply line 4 so that after the extruded plastic travels through the usual air cooling ring 5 supplied by a blower 6, it is blown into a bubble B. The plastic bubble is supported by guides 7, is ultimately flattened or collapsed by collapsers 9 and in the form of a flattened tube is pinched off substantially air-tightly by draw-off pinch rolls 10.

The equipment and operation described above may follow conventional practices excepting for the fact that the blow-up ratio should be higher than is usual. The blow-up ratio for film for conventional use is usually in the range of 1:1.2 up to 1:2.5, whereas the drawndown speed varies from 1:4 up to 1:20. The higher the drawdown speed the higher the production rates. The low drawdown speed in the embodiment of the present invention is partly compensated by the higher blow-up ratio, which, however, brings in more difficulties in the blowing process. For any given material and any given equipment the best operating conditions can easily be determined.

In this practice of the present invention, the blow-up ratio is in the range of 1:3.5 to 1:7 which is about the maximum permissible with conventional blowing equipment. It is to be understood that the blow-up ratio is the ratio between the orifice diameter of the annular die 3 with respect to the diameter of the bubble B. In the specific embodiment described here, this ratio is about 1:5. Such a high blow-up ratio produces a film that is highly shrinkable transversely. In practicing the present invention, the drawdown or longitudinal extension resulting from any difference in speed of linear travel imparted by the draw-off pinch rolls 10 relative to the speed of extrusion of the plastic from the die 3, is kept as low as is possible consistent with proper operation of the extrusion film blowing equipment. In the specific embodiment described here the drawdown speed is about 3.8 m./min. Obviously, if the pattern of slits extend transversely to the slits, the drawdown can be speeded up.

Leaving the draw-off pinch rolls 10, the now flattened tube of plastic film F travels over various rollers 11 past a slitter 12 which slits one of the fold lines of the flattened tube so that the tube may be opened subsequently if desired, and thereafter the film is formed into a coil 13 by suitable coiling equipment which is not illustrated since it may be of standard construction. This equipment and all of the elements guiding the flattened film to it are operated so that the tension on the film is adjusted only for the purpose of proper coiling. The length of film coil is limited only by the facilities available for coiling and handling the coil 13. The installation may also be provided with a second slitter (not shown) at the opposite side of the film facing the slitter 12 so that the flattened tube can be slit up along both fold lines and the two film strips obtained in this manner coiled up separately as two separate coils 13.

Referring now to FIGS. 2 and 3, the coil 13 is mounted on suitable uncoiling equipment (not shown) and its film F is continuously removed and guided by rollers 14 as a continuously traveling strip through a rotary slitter 15 designed to apply the desired pattern of slits through the single or doubled film. In the latter case, the still folded or flattened film is drawn by a roll set 16 to a triangular opening plate 17, a film separate bar 18 is provided for between the slitting tool 15 and the roll set 16 loosening the two layers of the folded film as a preliminary step. The triangular opening plate 17 spreads the folded film flatly to its full extent or, in other words, its width established by the circumference of the bubble B. It is in this way that the maximum width of final product is obtainable.

Reference to FIG. 4 shows the general construction of the rotary slitting tool 15 and in more detail the manner in which the folded film is opened. The slitting tool 15 may comprise a plurality of circumferentially interrupted slitting discs 15a which may be clamped on a rotary shaft 15b in proper relative orientation. FIG. 5 somewhat schematically shows the slitting of the unfolded film while FIG. 6 in the same fashion shows how multiple films of the unfolded flattened film may be superimposed to obtain a product of greater thickness. In such cases the maximum width of net product is not obtained as it is when the flattened film tube is unfolded as described hereinabove, but unfolded full width films may, of course, also be superimposed.

Concerning product dimensions, in the present practice of this invention, the annular extension die 3 has a diameter of 150 mm. while the diameter of the bubble B is about 750 mm. This gives a film width on the reel 13 of 1,180 mm. With the radial width of the annular die slot being 2 mm., the ultimate film thickness obtained is 0.2 mm. The average production rate is from 3.8 to 4 m. per minute. The drawdown or lengthwise stretch is kept to a practical minimum in the order of from 1:2 to 1:2.2, which can be compared to the much greater transverse stretch producing the transverse shrinkability because of the blow-up ratio of 1:5. When the folded film is opened or unfolded as described above, it has a width of 2,360 mm. All of this is in connection with the present operation of the invention and the values may vary depending upon the blown film extrusion equipment available, on the thermoplastic material used and on the thickness of the film F.

The slit pattern shown by FIGS. 8 and 11 produces a net structure that is particularly useful because it comprises a uniform honeycomb lattice work having net sides or strands of substantially equal length, the net resisting particularly well high stresses relative to its thickness while being both attractive and having a high inherent shape stability.

Having reference to FIG. 8 in particular, each slit 18 has a length of 4 mm., the slits are spaced a distance of 2.7 mm. between the ends of the slits of any one row, and the rows of slits are spaced apart a distance of 1.7 mm. The slits of each row are uniformly staggered or longitudinally offset with respect to the slits of each adjacent row.

The use of such longitudinally extending rows of interspaced slits, or comparable slits of different dimensions, has the practical advantage of permitting substantially full retention of the longitudinal strength of the film. This is important considering the necessity to feed the film longitudinally in a continuous manner through the equipment shown, and keeping in mind particularly the greater tension on the strip exerted when it is unfolded or opened by being drawn over the triangular opener 17 as is required when the full width of ultimate product is desired. These longitudinal rows of slits have little or no effect on the longitudinal strength or stretch resistance of the film.

Returning to FIG. 3, the continuously traveling film is guided by rollers 19 over a cylindrical roll 20 under enough tension to remove the unfolded fold line, if necessary, and assure absolute flatness of the film. The film is then guided by rollers 21 through a heating chamber 22. These rollers 21 are interspaced to form two free or unsupported traveling strip spans 23 and 24 of the film F. A bank of radiant heaters 25 is located above the span 23 and a second bank of such heaters 26 is located above the span 24. The rollers 21 are heated and at the opposite ends of the two spans are in tractional engagement with the film and powered to turn at the same peripheral speeds.

In place of the banks of radiant heaters 25, 26 the film may be heated by circulating hot air, wherein the air is heated by conventional heat exchangers and circulated by blowers (not shown). Circulating air may provide for a better uniformity of temperature over the heating zone and reduces, therefore, tearing hazards due to excessive temperature gradients in the film material.

Referring now to FIG. 7 where, to compact the view, only one of the radiant heaters 25 and one of the radiant heaters 26 are shown. While traveling through the heating zone, the edges of the film are gripped by suitable traveling chain edge grippers 27 which serve to positively maintain the film width. Chains traveling on the underside of the film edges and provided with pins (not shown) on which these edges are impaled have been used satisfactorily. The first bank of heaters 25 preheat the film and the second bank of heaters brings the temperature of the film to the degree required to release the shrinking tension, previously imparted, with consequent shrinkage of the film. The heating should not be so great as to cause the spans to sag and such heating is not required. The slits 18 gradually open, as illustrated by FIG. 7, to provide the film with the net pattern shown by FIG. 9. Because the film is substantially free from all frictional resistance to movement, the net pattern develops without interference of any kind. Reference to FIG. 10 shows that the strips 28 which define the mesh openings 29 all lie in the same flat plane and at their junctions with each other are free from any local thickening effect. The net obtained has the same uniform thickness throughout in all directions. The final thickness is greater than the original thickness of the film F, since the volume per square area of plastic material has not changed, but has been condensed in the network lattice between the openings. This is another advantage of the process according to the invention, since the blowing process provides for limited film thicknesses only and nets of increased thickness are often asked for different purposes.

As shown by FIG. 3, the film net leaving the heating chamber 22 passes over cooling rolls 20 and after separation of the marginal edges to waste by means of two rotating cutting knives (not shown) is then coiled into a coil 31 of the net product. Any suitable continuous coiling equipment (not shown) may be used.

The net segment shown by FIGS. 9 and 10 is an accurate showing of the die-cut appearance of the final net product when using the slit pattern and film produced as described in detail hereinabove. This product has the same appearance throughout the length and width of the plastic net coiled to form the coil 31. FIGS. 9 and 10 are enlarged in scale, but are otherwise accurate in detail. The product is flat, free from thickness and width variations, so it can be coiled in long lengths and has a high stability of area.

Netting in the heating chamber is done with the film having a linear speed of 4.5 m. per minute. This is close to the film production rate of 3.8 to 4 m. per minute. By adjustment of the processing conditions, the process may be made fully continuous to eliminate the described coiling and uncoiling interruption.

Figure 12:
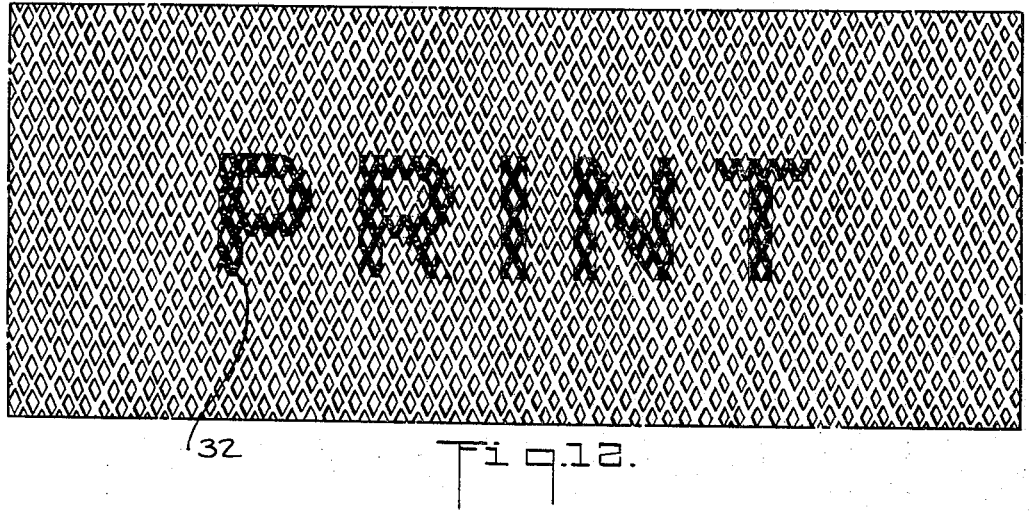
FIG. 12 is the same as FIG. 11, but showing the final net product.

As previously suggested, before or after the slitting operation and before the heat-netting action, the film may be imprinted with any desired display as indicated at 32 in FIG. 11, FIG. 12 showing that after netting, the display remains relatively unchanged.

Figure 13:
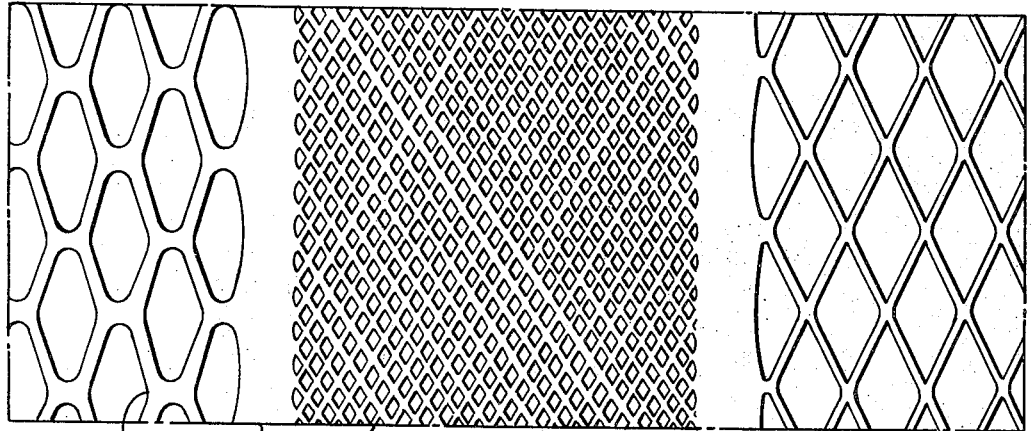
FIG. 13 illustrates a decorative effect possible by the use of the present invention.

FIG. 13 shows an example of decorative net obtained by limiting the previously described slitting to the center portion of the traveling film with the result that the previously described net pattern is restricted to the zone 33. Outwardly of this zone, by the use of a staggered pattern of longer and more widely spaced slits, a much larger net pattern 34 is obtained. Because solid or unslitted portions 35 separate the portions 33 and 34, a definite transverse film shrinkage results which must be taken into account when the production of a flat product is desired. In other words, when the thermal netting operation is complicated by such elaboration of the slitting, some experimentation, experience and skill may become necessary and distortions of the opening pattern in the vicinity of full areas must be taken into account.

During the netting of multiple layers of film, the heating laminates the layers together during the netting operation. With multiple layers, it is possible to use differently colored films or films of different synthetic materials which weld together under the shrinkage conditions.

Because the net illlstrated by FIGS. 9 and 10 has very substantial volume stiffness and stability, it finds particular use as a primary backing for floor coverings. This is illustrated by FIGS. 14 and 15 where the plastic net has a layer of felt 30 needled through it. As shown by FIG. 15, the bottom portion 31 of felt 30 including the plastic net may be bonded adhesively by a latex impregnation as known in the art of making tufting or needle felt floor coverings.

A floor covering of the above kind has the advantage of low cost and, although not a woven product, of being washable and having good dimensional stability. The plastic net backing is free from any tendency to rot or to discolor the felt if exposed to high humidity.

The unique netting action, graphically disclosed by FIG. 7, to produce the previously described die-cut net appearance, does not result if the slits are aligned with the direction of shrinkability of uni-directionally stretched film, or if the described shrinkage is restrained as by occurring while compressed between two body surfaces. It does not result if the pattern of slits provide for plain or unslit strips passing in straight lines through the pattern transversely to the longitudinal extension of the slits.

With the present invention the heat shrinkable plastic film formed with the interspaced rows of interspaced slits with each row having its slits in overlapped relationship relative to the slits of its adjacent rows and with the slits extending transversely relative to either the width or the length of the film but transversely with respect to a shrinking direction of the film, is caused to travel lengthwise continuously through a heating zone. Throughout this heating zone the film is held transversely by its traveling edges by the chains or their equivalent to restrain the film against transverse overall contraction to assure netting in a uniform controlled manner. At the beginning and ending of the span of film traveling through the heating zone the film travel is controlled by being in tractive engagement with rollers or their equivalent which operate at speeds insuring that the film enters and leaves the span at substantially equal linear speeds in the usual operation of the invention, although these speeds may be slightly varied under some conditions to keep the strip under tension less than that which will cause rupturing of any portions of the film, but greater than that resulting from the inevitable longitudinal shrinkage of the film and which is effective to keep the span taut. It is impractical to produce film free from any longitudinal shrinkage.

As the film thus restrained travels through the heating zone, while having the rows of mutually overlapping slits oriented transversely to the shrinking direction, preferably that of major shrinkability, the portions or strands of the film between the mutually adjacent slits are entirely free to shrink. Any supporting rolls used beneath the traveling span should be designed to avoid any material restraint to the shrinkage that occurs.

The film entering the heating zone smoothly and progressively increases in temperature throughout its width and while its entire area containing the slits where netting is desired is free from any material restraint to the movement incidental to shrinkage. Longitudinal tension on the film while traveling through the heating zone holds the film span taut. The netting action is obtained with maximum uniformity when the traveling edges of the film are held positively as previously described, although netting action suitable for some purposes may be effected when the film edges are not held.

In the heating zone the film should not be heated so much that it softens to a melting condition making the film capable of wetting and adhering to surfaces. Such heating is not required for the netting effect and would make impossible the continuous operation of the present invention.

When the lateral edges of the film are forcibly conveyed along predetermined paths, as by the use of the chains 27 or their equivalent, the paths may be parallel to each other as indicated by FIG. 7, or may diverge from the beginning of the shrinking zone to the end of this zone. In the latter instance the effect of the film shrinkage is not lost, there being instead a combination of this effect plus transverse stretching. As previously indicated, the tractive devices, such as the rollers 21, may cause the film to travel through the shrinking zone uniformly or so that the traveling speed is increased from the beginning of this zone to its end.

When two layers of plastic material are superimposed to form a film in which the previously described patterns of cuts is made through the film, and therefore both layers, a suitable separating medium may be used loosely between the two layers and the film then subjected to the shrinkage to effect the netting, after which the two layers may be separated for storing on separate rollers.

What is claimed is:

1. A method for making thermoplastic net, including cutting parallel interspaced rows of endwise interspaced elongated cuts through a length of thermoplastic film which shrinks in a known direction relative to this length when heated, said rows being cut to extend transversely with respect to said direction, forming a span in said length wherein the uncut portions of said film between said cuts are free to shrink in said direction substantially without restraint, causing said length to continuously travel longitudinally through said span, and applying heat to said span throughout a longitudinally extending zone to thereby progressively heat the traveling film to a temperature causing said uncut portions to shrink in said direction with consequent thickening and to an extent forming said cuts into net openings, prior to leaving said span.

2. The method of claim 1 in which said length when entering and leaving said span is caused to travel at substantially constant and uniform linear speeds while holding said length longitudinally taut without thereby materially stretching it while said portions shrink as the length travels through the span.

3. The method of claim 1 in which the edges of said length are forcibly guided through fixed traveling paths while the length travels through said span, said paths extending in directions holding the length in the span transversly taut without thereby materially affecting said shrinkage of said uncut portions.

4. The method of claim 3 in which said length when entering and leaving said span is caused to travel at substantially constant and uniform linear speeds holding said length longitudinally taut without thereby materially stretching it while said portions shrink as the length travels through the span.

5. The method of claim 4 in which said paths are substantially parallel to each other.

6. The method of claim 1 in which said length of thermoplastic film comprises a plurality of layers of thermoplastic film which are superimposed and which all shrink in said direction when heated.

7. The method of claim 1 in which said length of thermoplastic film comprises a plurality of layers of thermoplastic film which are superimposed and which all shrink in said direction and are joined together integrally by a fold line along one side edge during said cutting and which after said cutting and prior to entering said span are unfolded to form a single layer.

8. The method of claim 7 in which said layers are unfolded after said cutting and prior to being formed into said span, by drawing said length lengthwise over an opening plate, said known direction of shrinking being transverse with respect to said length and said rows of cuts extending longitudinally with respect to said length so that the latter retains a substantial amount of its uncut longitudinal strength during said unfolding.

References Cited

UNITED STATES PATENTS

| | | | |
|---|---|---|---|
| 2,533,609 | 12/1950 | Nolan et al. | 264—230 X |
| 3,187,380 | 6/1965 | Harrison | 264—156 X |
| 3,273,329 | 9/1966 | Scragg | 264—Dig. 47 |
| 3,400,810 | 9/1968 | Makowski | 264—321 X |
| 3,546,754 | 12/1970 | Erb | 264—230 X |
| 3,577,724 | 5/1971 | Greene | 264—Dig. 47 |
| 3,616,152 | 10/1971 | Chandler | 161—117 X |
| 3,642,967 | 2/1972 | Doll | 264—51 |

FOREIGN PATENTS

| | | | |
|---|---|---|---|
| 110,583 | 2/1961 | Pakistan | 264—Dig. 70 |
| 646,528 | 8/1962 | Canada | 264—Dig. 47 |

PHILIP E. ANDERSON, Primary Examiner

U.S. Cl. X.R.

156—84, 85, 229, 252, 256, 270; 161—109; 264—51, 154, 230, 288, 342 R, Dig. 71, Dig. 81